United States Patent Office 2,878,266
Patented Mar. 17, 1959

2,878,266
CHLOROMETHYLATION PROCESS

Herman Wachs, Baltimore, Md., and Sylvan E. Forman, Trenton, N. J., assignors to Food Machinery and Chemical Corporation, New York, N. Y., a corporation of Delaware No Drawing. Application March 21, 1957
Serial No. 647,482

4 Claims. (Cl. 260—340.5)

This invention relates to an improved process for the manufacture of dihydrosafrol derivatives, particularly chloromethyl dihydrosafrol and compounds for which chloromethyl dihydrosafrol is an essential intermediate.

Chloromethyl dihydrosafrol has the structural formula

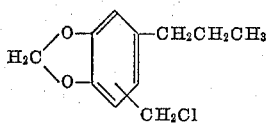

and has been used as an intermediate in the production of insecticides and synergists of the class represented by the formula

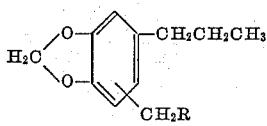

A particularly effective synergist of this latter class is that in which R is the diethylene glycol monobutyl ether (butyl Carbitol) radical. This synergist, commonly known as "piperonyl butoxide," may be obtained by reacting the sodium salt of diethylene glycol monobutyl ether with chloromethyl dihydrosafrol. The preparation and properties of both the intermediate compound and the final products have been described in U. S. Patents No. 2,485,-680 and 2,485,681, inventions of Herman Wachs.

U. S. Patent No. 2,485,680 describes the chloromethylation of dihydrosafrol. The present invention is a novel and useful improvement on that process. As a result of this invention substantially pure chloromethyl dihydrosafrol is now produced. In addition, this pure product is produced in quantitative yield and in a fraction of the time that was previously required. The pure chloromethyl dihydrosafrol may then be used directly, without further purification, to produce compounds such as piperonyl butoxide.

As described in U. S. Patent 2,485,680, chloromethyl dihydrosafrol is prepared by reacting dihydrosafrol with 40% formaldehyde solution and concentrated hydrochloric acid, by mixing and agitating for 36 hours at a temperature below 20° C. Under these conditions the major product is the desired chloromethyl derivative. However, this reaction is accompanied by side reactions which substantially reduce the yield and quality of the desired product. The most objectionable side reaction has been found to be the formation of a dimer, as shown in the following equation:

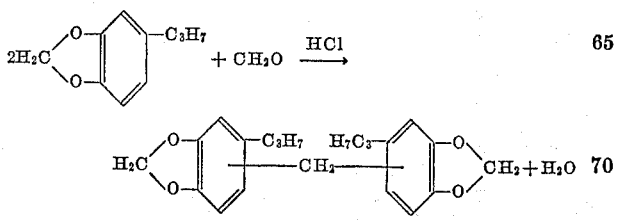

This diphenylmethane derivative is a white solid melting at 71.5° C. Substantial quantities of this dimer, and higher polymers, are formed when the procedure of U. S. Patent No. 2,485,680 is followed, so that the desired chloromethyl dihydrosafrol must be separated and purified by vacuum distillation before it may be reacted further to produce the insecticides and synergists for which chloromethyl dihydrosafrol is a valuable intermediate. Since benzyl chlorides in general tend to polymerize rapidly when heated, even vacuum distillation of the chloromethyl dihydrosafrol does not avoid the formation of an added residue, which reduces the yield even further.

The prior art in this field did not recognize that it is possible, under certain conditions, to carry out this chloromethylation reaction in a way which both inhibits side reactions and accelerates the overall reaction. The preferred process of Wachs Patent No. 2,485,680 teaches that the reaction temperature should be maintained below 20° C. Although the disclosure therein suggests that variations in temperature, reagents and concentration are permissible, there is no indication that higher temperatures may be used to advantage. On the contrary, the chemistry of safrol-type compounds suggests that increasing both the temperature and concentrations of the reagents would be undesirable. For example, hot concentrated hydrochloric acid might be expected to cleave the dioxymethylene group of the dihydrosafrol. Further, high temperatures and high concentrations of reagents might be expected to produce a great deal of polychloromethylation and methylene bridging, especially because of the fact that the relatively mild conditions of the prior art process produce a substantial amount of dimer due to methylene bridging.

In the process of the present invention, dihydrosafrol is chloromethylated in a reaction mixture containing formaldehyde, hydrochloric acid and calcium chloride, at elevated temperatures. The aqueous solution must be saturated with hydrogen chloride, the calcium chloride serving to effect this saturation while maintaining the overall concentration of hydrochloric acid within a range which is easily handled and controlled. Under the conditions of this invention, the formation of polymerization side products is virtually eliminated, and the desired product is formed in such a high state of purity that it may be used directly in subsequent reactions.

By the procedure taught in the prior art, the yield of chloromethyldihydrosafrol from purified dihydrosafrol was 60% of the theoretical amount, and the yield of piperonyl butoxide from the chloride was 80% of the theoretical amount, making the overall yield of piperonyl butoxide 48%. By the improved procedures taught herein the yields of chloromethyl dihydrosafrol are 95–100% of theoretical, and the overall yield of piperonyl butoxide is 80% of theoretical.

The hydrochloric acid concentration in the aqueous phase of the chloromethylation reaction is preferably about 6.0 to 6.5 normal at the end of the reaction. This is accomplished by adding to the reaction mixture about 1 mole of hydrogen chloride per mole of dihydrosafrol and enough excess hydrogen chloride to adjust the acid concentration to the desired range. Enough calcium chloride should be present so that at the reaction temperature the solution is saturated with hydrogen chloride. It is preferred to initiate the reaction, by heating to about 80–85° C., before the calcium chloride is added, and then to add calcium chloride as the hydrogen chloride is used up. Adding calcium chloride in this way decreases the solubility of hydrogen chloride in the water layer, and causes more hydrogen chloride to be available to the dihydrosafrol. If calcium chloride is not used, irreversible side reactions take place, primarily methylene bridging between the dihydrosafrol molecules.

At the preferred concentration range of 6.0–6.5 N hydrochloric acid, optimum results are obtained when a total of about 15–16% calcium chloride is added during the reaction. When more than this amount of salt is present inferior results are observed, probably due to lack of hydrogen chloride in the aqueous phase. If less than the optimum amount of calcium chloride is present, it is necessary to increase the amount of hydrogen chloride in order to maintain a saturated solution. It is thus possible, for example, to run this reaction in the absence of calcium chloride if the hydrogen chloride concentration is as high as that described in applicants' co-pending application Serial No. 608,697, filed September 10, 1956. The present invention lies in the discovery that this very high acid concentration can be reduced within certain limits. It has been found that the hydrochloric acid must be at least about 5.5 normal, requiring about 18% calcium chloride, for good yields. When the normality drops below about 5.5 under the conditions of this invention the yield of product drops off sharply. The use of acid more concentrated than about 6.5 is more hazardous and less economical, and requires that smaller batches be run, and therefore is less preferable for commercial production. The formaldehyde used in this invention is preferably added in the form of a solid reversible polymer, such as paraformaldehyde. About 1.1–1.4 moles of formaldehyde per mole of dihydrosafrol give best results, although slightly higher amounts do not have a marked adverse effect on the yields. Aqueous formaldehyde may also be used, although more hydrochloric acid and correspondingly more calcium chloride would be necessary to maintain the necessary concentration conditions.

These reactions are preferably carried out at temperatures in the range of 75° to 85° C. At lower temperatures, such as 60° C., not only is the reaction slower, but the yields are poorer. At higher temperatures some materials tend to distil and some gases are lost, these effects becoming significant over about 90° C. In the preferred temperature range of 75°–85° C. the reaction is completed within about 4 hours.

As starting materials in this process, either purified dihydrosafrol or hydrogenated *Ocotea cymbarum* (Brazilian sassafras oil containing approximately 90% safrol) may be used. In the prior art process only the purified raw material gave adequate results.

The preferred practice of this invention is illustrated as follows:

One hundred and eighty-two parts of 90% dihydrosafrol and 40 parts of paraformaldehyde (95% formaldehyde) were heated with 288 parts of 35% hydrochloric acid for one hour at 80° C. Maintaining the temperature between 75° and 85° C., 50 parts of calcium chloride was added over one and one half hours. Heating at 80° C. was continued for another hour, after which the layers were separated, yielding 232 parts of 95% chloromethyl dihydrosafrol. This product was reacted without further purification with sodium butyl carbitolate, as follows:

Forty-eight parts of sodium hydroxide and 390 parts of butyl Carbitol were stirred and heated at 80–100° C. until the caustic dissolved. Water was then removed by distillation under vacuum, and 213 parts of chloromethyldihydrosafrol was added slowly with stirring. After the addition was completed, the temperature was held at 80° C. for one hour and then at 110–120° C. for 3–4 hours. The mixture was cooled to 80–90° C., and 200 parts of water was added until the salt dissolved. The layers were allowed to separate, and the oily layer was distilled under reduced pressure. Piperonyl butoxide of high purity was obtained, distilling at 195° C. at 2 mm. of mercury.

That which is claimed as patentably novel is:

1. An improved process for preparing chloromethyl dihydrosafrol, comprising reacting hydrogenated safrol-bearing oils at 60–90° C. in an aqueous system containing paraformaldehyde, excess hydrochloric acid and about 10–18 percent by weight of calcium chloride, adjusting the hydrogen chloride concentration whereby the aqueous phase at the end of the reaction is about 5.5–8.0 normal in hydrochloric acid.

2. An improved process for preparing chloromethyl dihydrosafrol, comprising reacting dihydrosafrol at 60–90° C. in an aqueous system containing a slight molar excess of formaldehyde, about a 1.5–3 molar excess of hydrogen chloride, and about 10–18% by weight of calcium chloride.

3. An improved process for preparing chloromethyl dihydrosafrol, comprising reacting dihydrosafrol at about 75–85° C. in an aqueous system containing about 1.1–1.4 moles of formaldehyde per mole of dihydrosafrol, about 3 moles of hydrogen chloride, and about 15–16% by weight of calcium chloride, whereby the reaction mixture is saturated with hydrogen chloride at the reaction temperature and the aqueous phase at the end of the reaction is about 6.0–6.5 normal in hydrochloric acid.

4. An improved process for preparing chloromethyl dihydrosafrol, comprising reacting hydrogenated safrol-bearing oils with an aqueous solution containing about 1.1–1.4 moles of formaldehyde per mole of dihydrosafrol at a temperature of about 75–85° C., bubbling gaseous hydrogen chloride into said solution at a rate adjusted to maintain about a 6.0–6.5 normal concentration of hydrochloric acid, and sufficient calcium chloride to saturate the aqueous pahse with hydrogen chloride at the reaction temperature.

References Cited in the file of this patent

UNITED STATES PATENTS

| | | |
|---|---|---|
| 2,485,680 | Wachs | Oct. 25, 1949 |
| 2,485,681 | Wachs | Oct. 25, 1949 |

OTHER REFERENCES

Fuson et al.: Organic Reactions, vol. 1, 1942, pages 66–67.